(12) United States Patent
Raudszus et al.

(10) Patent No.: US 7,963,484 B2
(45) Date of Patent: Jun. 21, 2011

(54) LIFT-AUGMENTING FLAP, IN PARTICULAR FOR A LEADING EDGE FLAP, FOR AN AERODYNAMICALLY EFFECTIVE WING

(75) Inventors: Morten Raudszus, Berlin (DE); Bernhard Schlipf, Bremen (DE); Luc Andreani, Bremen (DE); Xavier Hue, Bremen (DE); Mark Heintjes, Bremen (DE)

(73) Assignee: Airbus Deutschland GmbH (DE)

( * ) Notice: Subject to any disclaimer, the term of this patent is extended or adjusted under 35 U.S.C. 154(b) by 277 days.

(21) Appl. No.: 11/922,068

(22) PCT Filed: Jun. 14, 2006

(86) PCT No.: PCT/EP2006/005758
§ 371 (c)(1),
(2), (4) Date: Jul. 8, 2009

(87) PCT Pub. No.: WO2006/133940
PCT Pub. Date: Dec. 21, 2006

(65) Prior Publication Data
US 2009/0272853 A1 Nov. 5, 2009

(30) Foreign Application Priority Data
Jun. 16, 2005 (DE) .......................... 10 2005 027 749

(51) Int. Cl.
*B64C 3/50* (2006.01)
(52) U.S. Cl. ........................................ 244/214; 244/213
(58) Field of Classification Search .................. 244/214, 244/213, 123.1
See application file for complete search history.

(56) References Cited

U.S. PATENT DOCUMENTS

| | | | |
|---|---|---|---|
| 4,040,579 A | 8/1977 | McKinney | |
| 4,171,787 A * | 10/1979 | Zapel | 244/219 |
| 4,200,253 A | 4/1980 | Rowarth | |
| 4,252,287 A * | 2/1981 | Zimmer | 244/219 |
| 4,285,482 A | 8/1981 | Lewis | |
| 4,475,702 A * | 10/1984 | Cole | 244/214 |
| 4,553,722 A * | 11/1985 | Cole | 244/219 |
| 4,650,140 A | 3/1987 | Cole | |
| 4,706,913 A * | 11/1987 | Cole | 244/214 |
| 5,544,847 A | 8/1996 | Bliesner | |
| 5,839,699 A | 11/1998 | Bliesner | |
| 5,927,656 A * | 7/1999 | Hinkleman | 244/203 |
| 6,015,115 A | 1/2000 | Dorsett et al. | |
| 6,276,641 B1 * | 8/2001 | Gruenewald et al. | 244/213 |

(Continued)

FOREIGN PATENT DOCUMENTS

DE 29 07 912 A 9/1980

(Continued)

*Primary Examiner* — Tien Dinh
*Assistant Examiner* — Justin Benedik
(74) *Attorney, Agent, or Firm* — Lerner, David, Littenberg, Krumholz & Mentlik, LLP (57) ABSTRACT

A lift-augmenting leading edge flap for a carrying wing of an aircraft, wherein the flap comprises an essentially rigid main body which makes a transition from the first side to the second side of the wing the flap being adjustable by a retention- and actuation mechanism coupled between the flap and wing box, between a first, retracted, position and a second, extended, position, wherein the first transition region of the flap is slidable to rest in each position essentially free of any gap, against the first skin of the wing box or against the wing end cover, in relation to the wing end cover.

30 Claims, 7 Drawing Sheets

U.S. PATENT DOCUMENTS

| | | | |
|---|---|---|---|
| 6,644,599 B2 * | 11/2003 | Perez | 244/219 |
| 6,796,534 B2 * | 9/2004 | Beyer et al. | 244/214 |
| 7,249,735 B2 * | 7/2007 | Amorosi et al. | 244/99.2 |
| 2007/0102587 A1 * | 5/2007 | Jones et al. | 244/214 |
| 2007/0241236 A1 * | 10/2007 | Whitehouse et al. | 244/214 |
| 2009/0302168 A1 * | 12/2009 | Hetrick et al. | 244/214 |

FOREIGN PATENT DOCUMENTS

| | | |
|---|---|---|
| EP | 0 100 775 A1 | 2/1984 |
| EP | 0 302 143 A1 | 2/1989 |
| GB | 2 186 849 A | 8/1987 |
| SU | 1 762 488 A1 | 4/1994 |
| WO | WO-84/02691 A1 | 7/1984 |

\* cited by examiner

Fig. 1

Fig. 1a)  Detail B

Fig. 1b)  Detail C

LIFT-AUGMENTING FLAP, IN PARTICULAR FOR A LEADING EDGE FLAP, FOR AN AERODYNAMICALLY EFFECTIVE WING

CROSS-REFERENCE TO RELATED APPLICATIONS

The present application is a national phase entry under 35 U.S.C. §371 of International Application No. PCT/EP02006/005758 filed Jun. 14, 2006 published in English which claims priority from German Patent Application No. 10 2005 027 749.7 filed Jun. 16, 2005, all of which are incorporated herein by reference.

BACKGROUND OF THE INVENTION

The invention relates to a lift-augmenting flap, in particular a leading edge flap, for an aerodynamically effective wing.

From the state of the art a large number of high-lift components are known which are designed to improve the lift characteristics of an aerodynamically effective wing, which high-lift components are used to increase the curvature and/or extent of the wing profile in wing depth direction and thus to increase the lift of the wing.

High-lift components of this type, which components in relation to the flow direction are provided at the front of the wing profile, are basically divided into leading edge flaps, which essentially without interruption follow on at the front of the wing profile, and leading edge slats, where there is a gap between the rear edge of the leading edge slat and the front of the actual wing, through which gap energy-rich air is led from the underside of the leading edge slat to the top of the actual wing.

Due to a delay in the boundary layer separation the leading edge slat configuration may be advantageous during the approach to landing, however, due to increased resistance may be less advantageous for takeoff, and due to unavoidable creation of oscillation and turbulence of the air flowing through the gap region said leading edge slat configuration may represent a significant source of noise.

Furthermore, a number of leading edge flaps may be known that comprise a flexible shell with variable curvature, wherein the rotary axis is also provided in the wing profile. Leading edge flaps are for example described in U.S. Pat. No. 4,475,702, U.S. Pat. No. 6,015,115, U.S. Pat. No. 6,796,534, U.S. Pat. No. 4,200,253, U.S. Pat. No. 4,553,722 and EP 0 302 143. Such leading edge flaps with variable curvature are associated with a disadvantage not only as a result of their great design complexity but also as a result of the difficulty of maintaining the predetermined wing profile at the desired accuracy. Further leading edge flaps with variable curvature are known from U.S. Pat. No. 4,650,140 and U.S. Pat. No. 4,706,913.

U.S. Pat. No. 5,927,656 describes a leading edge flap with a rigid profile, which leading edge flap by means of a lever mechanism can be adjusted in relation to a front wing end cover of a carrying wing, wherein between the flap and the front wing end cover a gap remains that allows air to flow over from the underside of the wing profile to its top.

From EP 100 775 a leading edge flap with a rotary axis situated underneath the wing profile is known, in which leading edge flap at the top of the wing long flexible shells are provided that are not closed off on the underside of the wing.

Finally, from U.S. Pat. No. 5,544,847 and U.S. Pat. No. 5,839,699 a high-lift device is known in which a leading edge slat can be extended in relation to the wing structure, by a guide rail that is curved in a circular manner, on a virtual rotary axis situated underneath the wing profile, i.e. on the pressure side. In the extended state there is a gap between the leading edge slat and the wing structure, which gap allows air that is rich in energy to flow over from the underside of the wing to its top. On the rear of the leading edge slat strong vortex regions are created that give rise to noise emission and increased resistance.

SUMMARY OF THE INVENTION

It may be desirable to provide a lift-augmenting flap, in particular a leading edge flap, for an aerodynamically effective wing, with which lift-augmenting flap good lift augmentation can be achieved while keeping the noise emission and the increase in resistance low.

Exemplary embodiments in the lift-augmenting flap according to the invention are stated in the claims.

According to the invention a lift-augmenting flap is created, in particular a leading edge flap (Nasenklappe), for an aerodynamically effective wing with a predetermined wing profile, in particular for a carrying wing (airfoil) of an aircraft. The wing comprises a wing box which on a first side comprises a first skin and on a second, opposite, side comprises a second skin and on its end facing the flap comprises a wing end cover which at least in part follows on from the first skin in a wing profile shape. The flap comprises an essentially rigid main body which makes a transition from the first side to the second side of the wing, and a first transition region that faces the first side of the wing, and a second transition region that faces the second side of the wing, and said flap is adjustable, by a retention- and actuation mechanism that is coupled between the flap and the wing box, between a first, retracted, position in which said flap overlaps a larger part of the wing end cover, and a second, extended, position in which said flap overlaps a smaller part of the wing end cover, wherein the first transition region of the flap, which region faces the first side of the wing, is slidable, so as to rest in each position essentially free of any gap, against the first skin and/or against the wing end cover that follows on from the first skin, in relation to said wing end cover. The invention provides for the flap to be positionable between the first and the second position, while obtaining an angle in relation to the wing box and concurrent extension of the wing profile on a virtual rotary axis that is situated on the side opposite the first skin, outside the wing profile, wherein the second transition region of the flap, which region faces the second side of the wing, in each flap position is sealed off from the second skin so as to be essentially free of any gap.

The lift-augmenting flap according to the invention may make possible a profile shape which overall is more continuous, with a favourable streamlined design along the entire profile, which results in a reduction in high suction peaks on the wing profile and in avoidance or delay of profile saturation. The profile shape that is largely steady on both sides of the wing results in a reduction of resistance and noise when compared to conventional flaps. There is a clear increase in lift when compared to conventional leading edge flaps, which increase in lift results from a concurrent increase in the profile curvature and profile extension in wing depth direction in the sense of a strong Fowler movement. Avoiding vortex regions on the underside of the wing results in improved aerodynamics, combined with reduced noise emission and reduced resistance. During the design phase the angle and Fowler path that result during extension of the flap can be selected within wide limits in a dependent relationship. The lack of a gap at the top of the profile, and of shielded vortex regions on the rear of the flap result in a reduction in noise and resistance.

According to an embodiment of the invention the location of the virtual rotary axis, on which location the flap is adjustable, is changeable along a defined curve, depending on the flap position.

However, according to an advantageous embodiment of the invention the virtual rotary axis on which the flap is adjustable is stationary for all flap positions.

According to an embodiment of the invention the retention- and actuation mechanism contains guide rod linkages coupled between the wing box and the flap, with said retention- and actuation mechanism being drivable by an adjustment drive that acts on said guide rod linkages.

An exemplary embodiment of the invention provides for the retention- and actuation mechanism to comprise a guide rail that is coupled between the wing box and the flap and that essentially extends in wing depth direction, with said retention- and actuation mechanism being drivable by an adjustment drive that acts on the guide rail.

According to an exemplary embodiment of the invention the guide rail forms a circular arc that has the virtual rotary axis as its centre, and the wing end cover, which at least in part follows on from the first skin in a wing profile shape, is also circularly curved on the virtual rotary axis so that the first transition region of the flap is movable in the sense of a circular movement along the circularly curved wing end cover when the flap is adjusted.

According to an exemplary embodiment of the invention the second transition region of the flap, which transition region faces the second side of the wing, is formed on a stressed skin wing panel (Flügelschalenprofil) that follows on from the shell of the rigid main body of the flap and extends to the second skin of the wing, and the second transition region is provided for sliding in relation to the second skin so as to provide, in every flap position, a transition to said skin essentially without a gap.

In this arrangement it may be advantageous if the region of the second skin, along which the second transition region of the flap is slidable in relation to the second skin when the flap is adjusted, extends essentially tangentially in relation to the virtual rotary axis.

According to an exemplary embodiment of the invention the second transition region is formed by a flexible region of the stressed skin wing panel that follows on from the rigid main body of the flap.

According to an exemplary embodiment of the invention the flexible region is provided at the end of the stressed skin wing panel that follows on from the rigid main body of the flap.

According to an exemplary embodiment of the invention the stressed skin wing panel comprises a first, rigid, panel region that follows on from the rigid main body of the flap, and comprises a second, flexible, panel region which in turn follows on from said first panel region, and which forms the second transition region.

Advantageously the inside of the first, rigid, panel region comprises stiffening ribs that extend essentially in wing depth direction.

Preferably the flexible region provided at the end of the stressed skin wing panel that follows on from the rigid main body of the flap is designed in the shape of a sealing lip that rests against the second skin.

According to an exemplary embodiment of the invention the retention- and actuation mechanism comprises several guide rails in the shape of circular arcs, which guide rails are arranged in wingspan direction on the virtual rotary axis that contains the centre of their curvature.

According to an exemplary embodiment of the invention the guide rails in the shape of circular arcs, of which guide rails there are several and which guide rails are arranged so as to be spaced apart in wingspan direction, have an identical radius of curvature.

According to another exemplary embodiment of the invention each of the guide rails in the shape of circular arcs, of which guide rails there are several and which guide rails are arranged so as to be spaced apart in wingspan direction, has a different radius of curvature that becomes smaller in wingspan direction.

According to one embodiment of the invention the wing end cover which follows on from the first skin at least in part in wing profile shape has a radius of curvature that is constant in wingspan direction.

According to an exemplary embodiment of the invention the wing end cover which follows on from the first skin at least in part in wing profile shape has a radius of curvature that decreases in wingspan direction.

Preferably, the radii of curvature of the guide rails and of the wing end cover become smaller at the same ratio in wingspan direction.

According to this arrangement the main body of the flap preferably tapers off in wingspan direction with the reduction of the radii of curvature of the guide rails and/or of the wing end cover.

According to an exemplary embodiment of the invention a recess or pocket is provided on the second skin so as to accommodate the stressed skin wing panel that extends towards the second skin, as a result of which recess or pocket an essentially smooth transition from the stressed skin wing panel of the flap to the second skin of the wing box is created at least in the retracted flap position.

In this arrangement the recess may have a depth that essentially corresponds to the thickness of the stressed skin wing panel that extends towards the second skin.

According to an exemplary embodiment of the invention the guide rail contained in the actuation mechanism is a toothed rack that is driveable by way of a driving pinion of the adjustment drive, which driving pinion engages said toothed rack.

Preferably the guide rail is guided by guide rollers.

According to an exemplary embodiment of the invention a locking device is provided on the wing box, by way of which locking device the stressed skin wing panel of the flap, which stressed skin wing panel extends towards the second skin, is lockable in relation to the wing box in the retracted flap position.

In particular, in this arrangement the locking device can be formed by cruise rollers.

Preferably, laterally on the flap a sealing device is provided which aerodynamically seals the flap off towards the outside.

The sealing device can comprise lateral panels that are slidable in relation to each other.

According to an exemplary embodiment of the invention the shell of the rigid main body of the flap and/or the rigid region of the stressed skin wing panel that extends towards the second skin are/is produced from carbon fibre reinforced plastic (CFRP).

Furthermore, according to an exemplary embodiment of the invention the flexible region of the stressed skin wing panel that extends towards the second skin is produced from glass fibre reinforced plastic (GFRP).

BRIEF DESCRIPTION OF THE DRAWINGS

Below, an exemplary embodiment of the invention is explained with reference to the drawing.

The following are shown:

FIGS. 2a) and b) a bottom view and a perspective view, respectively, of an aerodynamic wing with a lift-augmenting flap according to the exemplary embodiment shown, wherein the section view of FIG. 1 has been taken along line A-A of FIG. 2a;

DETAILED DESCRIPTION

In the following figures similar or identical elements are referred to by the same or similar reference signs.

A solution that has been applied in the AIRBUS A380 provides for a leading edge flap that essentially without any gap follows on from the front of the actual wing, which leading edge flap has a rigid profile and is pivotable on a rotary axis provided on the underside of the wing profile, in the sense of moving it between a retracted position and an extended position. In this arrangement the upper trailing edge of the flap describes a circular movement on said rotary axis along a likewise circularly curved front wing end cover, from which the leading edge flap follows on essentially without any gap.

Figure 1:
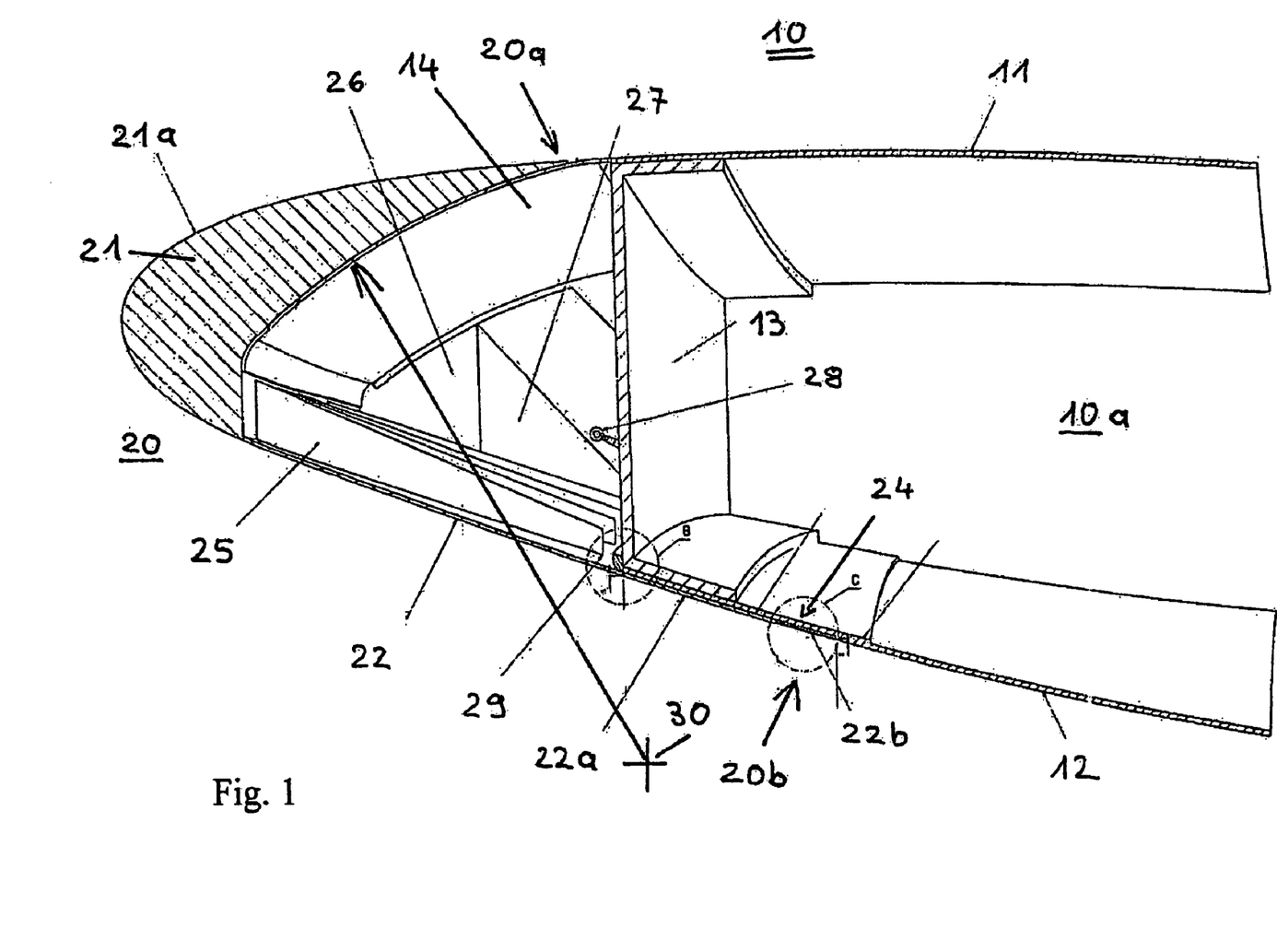
FIG. 1 a partial section view of an aerodynamic wing with a lift-augmenting flap according to an exemplary embodiment of the invention.

FIG. 1 shows a cross section of the front region of the carrying wing, which overall has been designated by the reference character 10, of an aircraft, on which carrying wing a lift-augmenting flap in the form of a leading edge flap 20 is provided.

The wing 10 comprises a wing box 10a on whose top a first skin 11 (Beplankung) is provided, and on whose underside a second skin 12 are provided. At the front of the wing box the skins 11, 12 are held at a defined space in relation to each other by a spar 13. Towards the front, i.e. towards the end facing the flap 20, the first skin 11 in the form of a wing profile partly follows on in a wing end cover 14.

The flap 20 comprises a main body 21 with a shell 21a that completes the wing profile towards the front. The configuration of the main body 21 and its shell (21a) is rigid.

On the underside of the main body 21 the shell 21a follows on in the direction towards the second skin 12 of the wing box 10a by a stressed skin wing panel 22. Said stressed skin wing panel 22 is firmly connected to the shell 21a of the main body 21 and at its end facing the second skin 12 of the wing box 10a is arranged so as to be slidable in relation to the second skin 12. On the inside of the stressed skin wing panel 22, reinforcement ribs 25 are provided which extend essentially in wing depth direction, which stabilise the stressed skin wing panel 22 and which contribute to said stressed skin wing panel 22 maintaining its shape.

Laterally, i.e. in the view of FIG. 1 on the rear end of the leading edge flap 20, lateral panels 26, 27 that are slidable in relation to each other are provided, which lateral panels 26, 27 aerodynamically close off the flap 20 towards the outside.

Figure 1A:
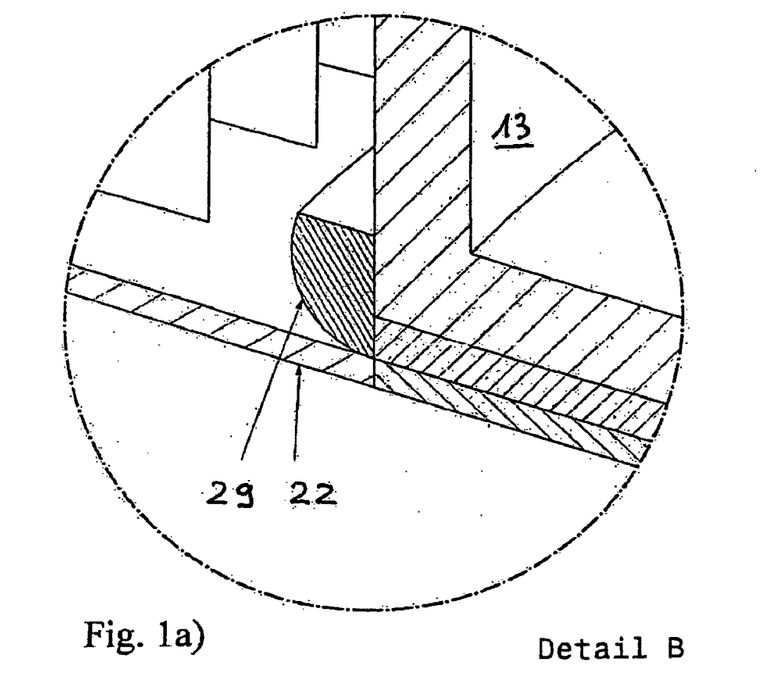
FIGS. 1a) and b) enlarged details of FIG. 1.

On the bottom end of the spar 13, on its side facing the flap 20, a reinforcement strip 29 that extends in wingspan direction can be provided, which reinforcement strip 29, as shown in the enlarged sectional drawing in FIG. 1a), in the example shown has a cross section in the shape of a quarter of a circular arc and is used to take up shear forces at the transition between the wing box 10a and the flap 20.

The stressed skin wing panel 22 comprises a rigid region 22a, which is adjacent to the main body 21 of the flap 20 and at its rear is stabilised by the previously mentioned reinforcement ribs 25, and further comprises a flexible region 22b that is located where the stressed skin wing panel 22 rests against the second skin 12 of the wing box 10a.

Figure 2A:
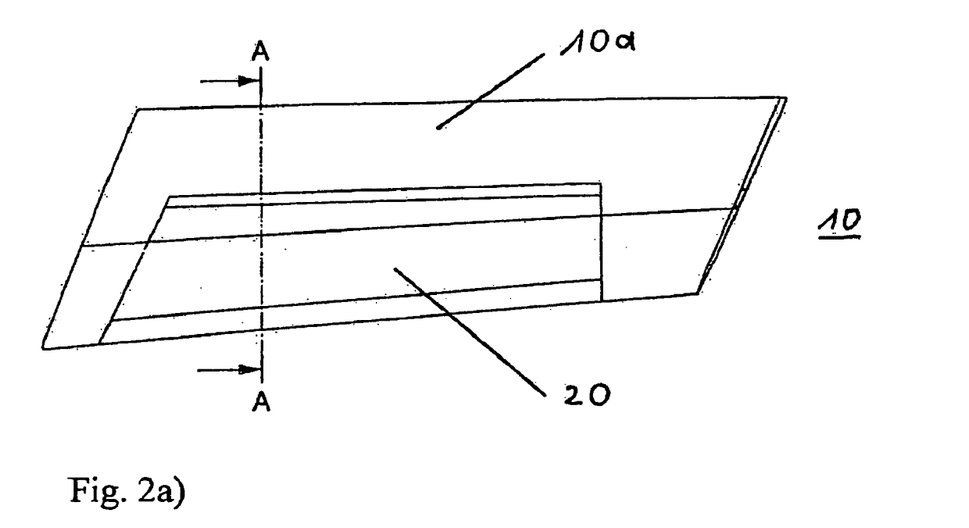
Figure 2B:
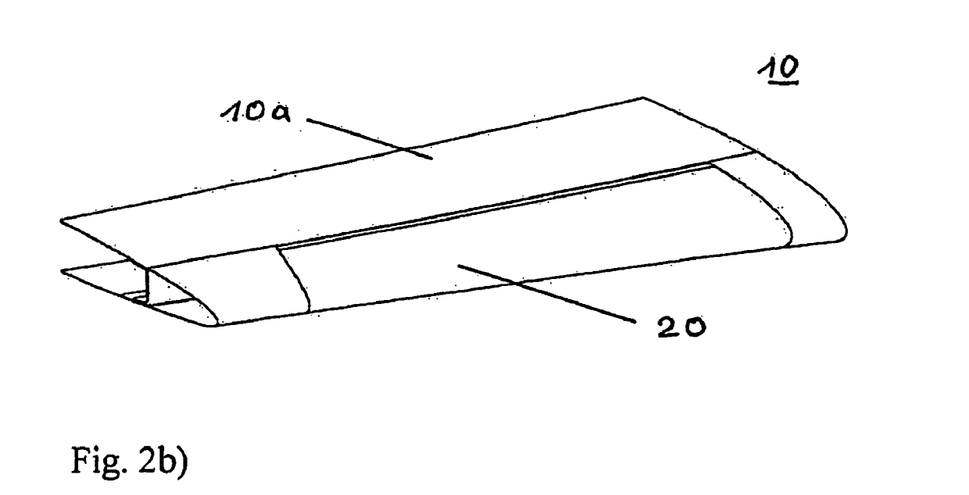

As shown in FIGS. 2a) and b) the flap 20 can be provided as a leading edge flap in close proximity to the root of the wing 10, or it can extend along a larger section in wingspan direction of the wing 10. The section view of FIG. 1 has been taken along the line A-A in FIG. 2a.

Figure 3:
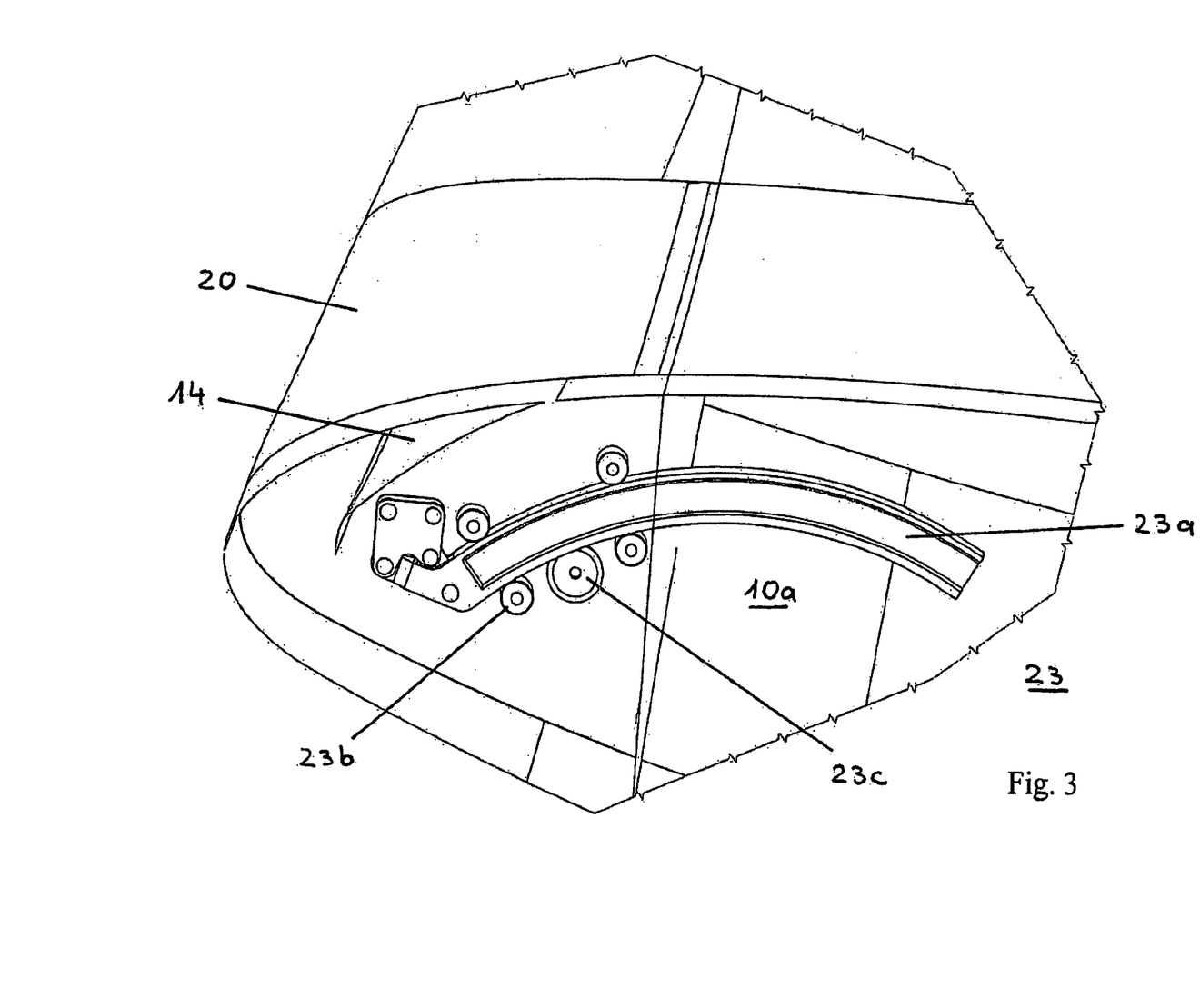
FIG. 3 a perspective view of the lift-augmenting flap according to the exemplary embodiment of FIG. 1, wherein a retention- and actuation mechanism of said flap is diagrammatically shown.

FIG. 3 diagrammatically shows a retention- and actuation mechanism which overall is labelled with the reference sign 23. This mechanism serves to hold the flap 20 to the wing box 10a and to render the flap 20 adjustable in the sense of adjustment between a first, retracted, position, and a second, extended, position, and of course to render said flap 20 adjustable in any desired positions in between.

This retention- and actuation mechanism 23 comprises a guide rail 23a which is curved in the shape of a circular arc, i.e. whose curvature is constant, wherein the centre of the curvature of the guide rail 23a defines a virtual rotary axis 30 around which the flap 20 is slidable during its adjustment on a thus also circular track.

As shown in FIG. 1, the wing end cover 14, which follows on from the first skin 11 at the front of the wing, forms a circularly curved area around the virtual rotary axis (in FIG. 1 indicated by a radius arrow), along which rotary axis 30 the flap 20 moves when it is adjusted. This means that the flap 20 with a first transition region 20a, which is defined by the end of the flap 20 that faces the first skin 11, i.e. by the end of the flap 20 which is the upper end in the figure, during the adjustment movement of the flap 20 rests essentially always without any gap against the wing end cover 14. A second transition region 20b, in which the flap 20 on the underside of the wing 10 makes a transition to the profile shape of the second skin 12, is defined by the rear end of the stressed skin wing panel 22, i.e. on the end of the second flexible panel region 22b.

On its side facing the virtual rotary axis 30, i.e. in FIG. 3 on the underside of the guide rail 23a, said guide rail 23a comprises a tooth arrangement which the tooth arrangement of a drive pinion 23c of a rotary drive (not shown per se in the figure) engages. In this way the guide rail 23a forms a toothed rack that interacts with the driving pinion 23c so that the flap 20 is adjustable by way of the rotary drive that drives the driving pinion 23c. In the exemplary embodiment shown, which for the purpose of explanation is only shown diagrammatically, the guide rail 23a is firmly held to the wing box 10a, while the drive pinion 23c and its rotary drive (not shown) are provided in the interior of the flap 20 and are movable together with said flap 20. Of course, conversely, it is also possible to provide an arrangement where the guide rail 23a is firmly connected to the flap 20 and moves together with said flap 20, while the drive pinion 23c and its rotary drive are provided in the wing box 10a.

The flap 20 is arranged so as to be stationary with the guide rail 23a and is held by an actuation mechanism 23 so as to be movable in relation to the wing 10a. Proper functioning of the retention- and actuation mechanism 23 is ensured by the guide rollers 23b, the drive pinion 23c and by the rotary drive (not shown), which in the exemplary embodiment shown in FIG. 3 are all arranged in the front spar 13 so as to be stationary.

Figure 5A:
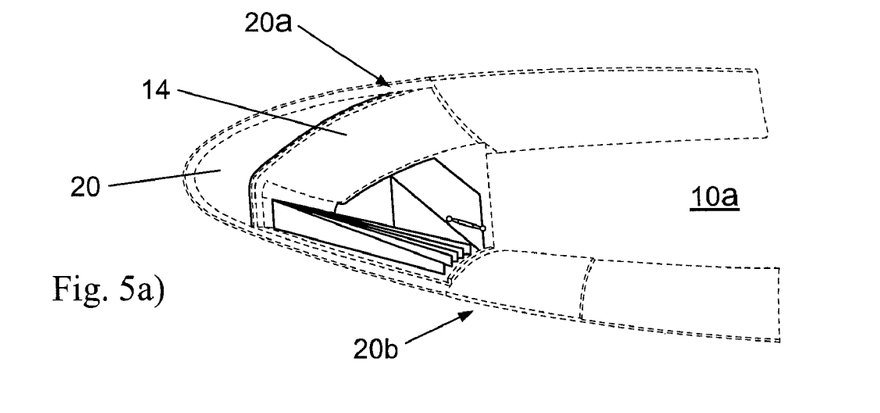
FIGS. 5a) to e) section views of the lift-augmenting flap of FIG. 1 in the retracted state (FIG. 5a)) and in various states of extension (FIGS. 5b) to e)).

FIGS. 5a) to e) show section views of the front region of the wing box 10a and the leading edge flap 20 similar to those shown in FIG. 1.

FIG. 5a) shows the completely retracted first position of the flap 20 according to FIG. 1, in which position the flap 20 largely covers the wing end cover 14 and thus completes the wing profile on the leading edge of the wing, thus forming the cruise configuration of the wing 10.

Figure 5B:
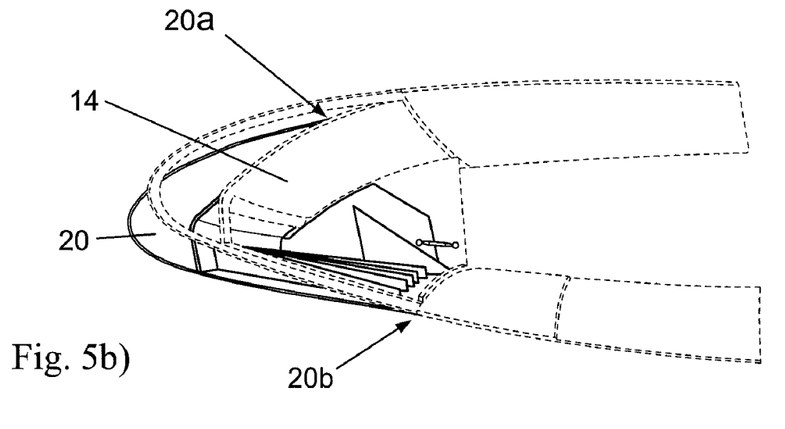
Figure 5C:
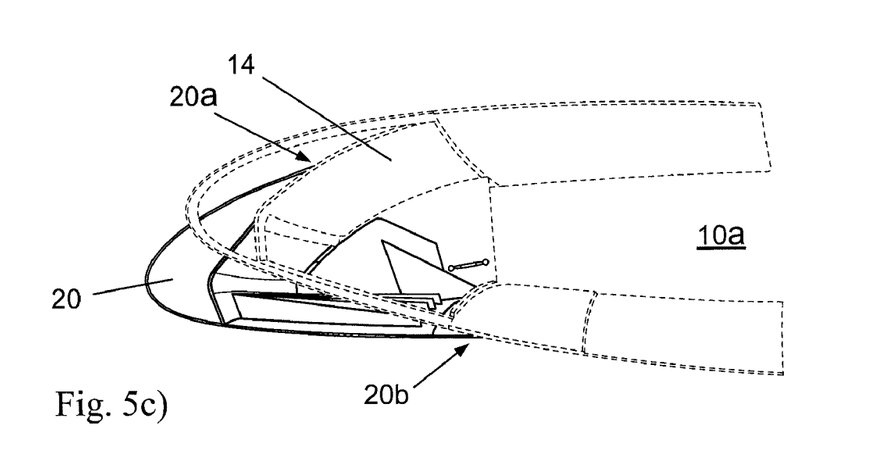
Figure 5D:
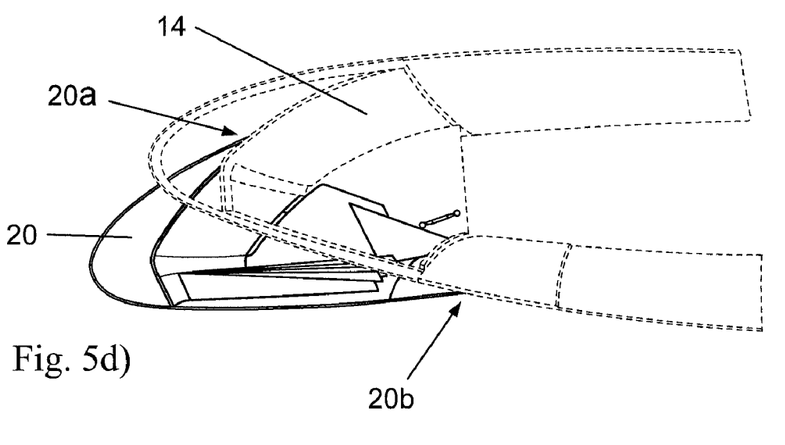
Figure 5E:
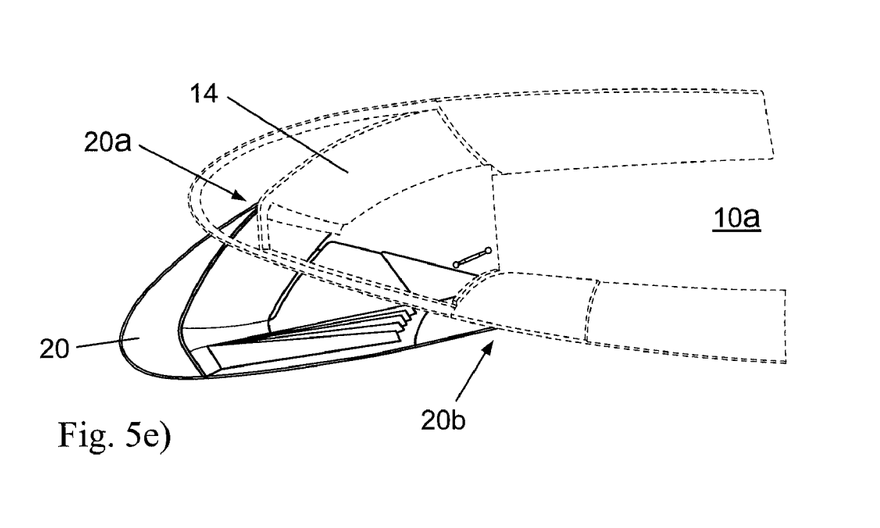

FIG. 5e) shows the flap 20 in the second, completely extended, position, in which position the flap 20 overlaps only a small part of the wing end cover 14, and which position represents a take-off and/or landing configuration of the wing 10, in which configuration maximum lift is achieved. Flap adjustment is in the sense of a Fowler movement in which an increase in the profile curvature is at the same time connected with an extension of the wing profile in wing depth direction.

FIGS. 5b) to d) shows three intermediate positions.

As is evident from a comparison of FIGS. 5a) to e) during extension of the flap 20 the first transition region 20a that faces the first skin 11 moves on a circular path on the virtual rotary axis 30 (compare FIG. 1), while the second transition region 20b, which is situated at the end of the stressed skin wing panel and which faces the second skin 12 during the extension movement of the flap 20, is dragged along the second skin 12 forward in wing depth direction. During this procedure the second transition region 20b of the stressed skin wing panel 20 always remains closely resting against the second skin 12 essentially without any gap. Thus in every position, i.e. in the first, retracted, position shown in FIG. 5a), in the second, extended, position shown in FIG. 5e, and in any intermediate position in between, as shown in FIGS. 5b) to d), the flap 20 essentially without any gap always remains closely resting against the first skin 11 and/or against the wing end cover 14 or against the second skin 12.

Figure 4:
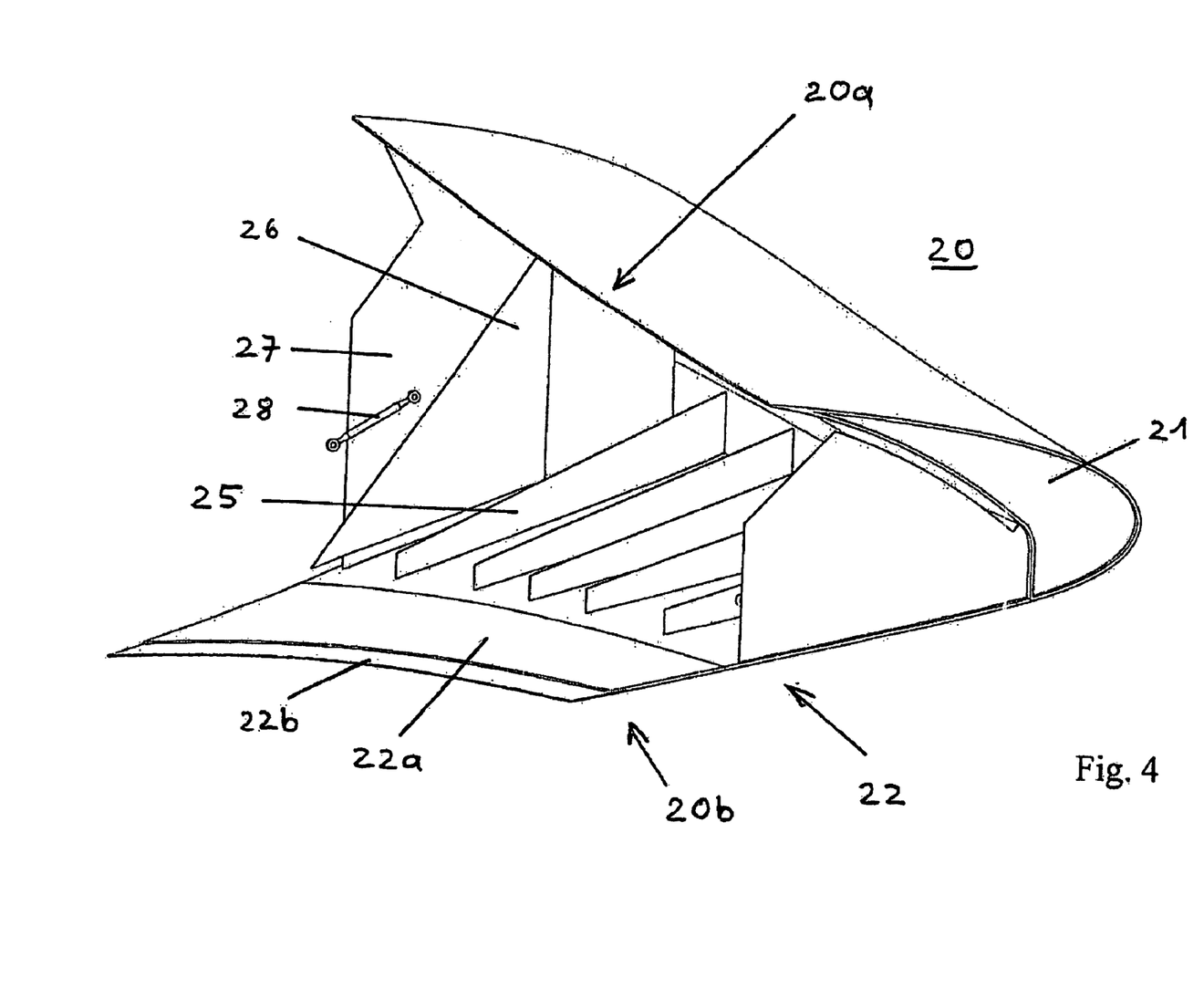
FIG. 4 a perspective view of the lift-augmenting flap in FIG. 1, viewed from another angle, with the wings not shown.

As shown in the perspective view of FIG. 4, as described above, the stressed skin wing panel 22, which follows on from the main body 21 of the flap 20 in the direction of the second skin 12 of the wing box 10a, is formed on the one hand by a first, rigid, panel region 22a that is situated more closely to the main body 21, and on the other hand by a second, flexible, panel region 22b that is situated further away from the main body 21. Said flexible panel region 22b forms a flexible sealing lip that is provided to rest against the second skin 12 of the wing box 10a.

If the stressed skin wing panel 22 is made from fibre reinforced plastic materials, the first, rigid, panel region 22a can preferably be made from carbon fibre reinforced plastic (CFRP), while the second, flexible, panel region 22b, which forms the sealing lip, can be made from glass fibre reinforced plastic (GFRP). The shell 21a of the flap 20, which shell 21a forms the leading edge of the wing, can also in a rigid manner be made from carbon fibre reinforced plastic (CFRP). Preferably, to achieve an increase in strength the shell 21a and the first, rigid, panel region 22a are of an integral design, i.e. are made in one piece. The panel regions 22a and 22b can be interconnected by a riveted connection or a screwed connection or in some other suitable manner.

The lateral panels 26, 27 shown in FIGS. 1 and 4, which lateral panels 26, 27 are slidable in relation to each other, are connected to the wing box 10a by a coupling element whose length is variable.

As shown in FIG. 1, the region of the second skin 12—along which the second transition region 20b, in the exemplary embodiment shown thus the second panel region 22 that is designed as a flexible sealing lip, is slidable during flap adjustment in relation to the second skin 12—has an essentially tangential alignment in relation to the virtual rotary axis 30. This means that the previously mentioned dragging movement of the second transition region 20b along the second skin 12 necessitates only to a small extent any deformation of the second panel region 22b at this position.

When viewed in wingspan direction the retention- and actuation mechanism 23 of the embodiment shown comprises several guide rails 23a in the shape of circular arcs, spaced apart from each other in this direction, as shown in FIG. 3. The centres of curvature of these guide rails 23a are arranged on the virtual rotary axis 30, i.e. the movement of the guide rail 23a and thus also the movement of the flap 20 is on the virtual rotary axis 30, which also extends in wingspan direction, of which rotary axis 30 only one point is shown in FIG. 1.

These several guide rails 23a in the shape of a circular arc, which guide rails 23a are arranged in wingspan direction of the wing 10 so as to be spaced apart from each other, can have identical radii of curvature, or they can have different radii of curvature that typically decrease in wingspan direction.

The wing end cover 14, which follows on from the first skin 11 forward in wing profile shape, typically has a radius of curvature that decreases in wingspan direction, with which direction also tapering-off of the main body 21 of the flap 20 in wingspan direction is associated. In such a configuration, typically the radii of curvature of the guide rails 23a and of the wing end cover 14 decrease at the same ratio.

Figure 1B:
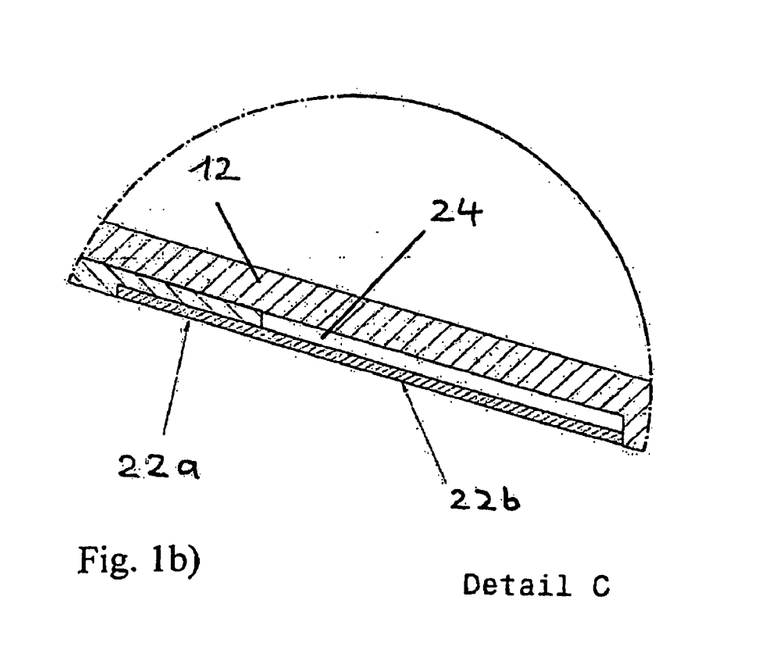

As shown in FIG. 1 and in particular in the enlarged detail shown in FIG. 1b), on the second skin 12 a recess 24 is provided that is designed to accommodate the end of the stressed skin wing panel 22 that extends towards said second skin 12, which recess 24, at least in the retracted flap position, results in an essentially smooth, i.e. step-free, transition from the stressed skin wing panel 22 of the flap 20 to the second skin 12 of the wing box 10a. The depth of this recess 24 essentially corresponds to the thickness of the stressed skin wing panel 22.

In order to lock the stressed skin wing panel 22 of the flap 20 in relation to the wing box 10a when the flap is retracted, i.e. when the flap 20 is in the cruising position shown in FIGS. 1 and 5a, on the inside of the stressed skin wing panel 22 near the spar 13 of the wing box 10a locking devices in the form of cruise rollers that are known per se can be provided, which locking devices are however not specially shown in FIG. 1.

The essentially gap-free transition of the flap 20 to the first skin 11 or to the wing end cover 14 that follows on from said first skin 11 at the first transition region 20a on the one hand, and to the second skin 12 at the second transition region 20b on the other hand results in a complete overall wing profile that is essentially free of any interruptions and that is associated with an aerodynamically favourable streamlined design with a very significant increase in lift, with little resistance and with little noise generation. This arrangement is advantageous in particular in that it provides an overall essentially continuous shape of the overall wing profile, which shape is free of any vortex regions on the underside of the wing and is free of other shielded leeward regions that contribute to the generation of vortices.

It should be noted that the term "comprising" does not exclude other elements or steps and the "a" or "an" does not exclude a plurality. Also elements described in association with different embodiments may be combined. It should also be noted that reference signs in the claims shall not be construed as limiting the scope of the claims.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

LIST OF REFERENCE CHARACTERS

10 Wing
10a Wing box
11 First skin
12 Second skin
13 Spar
14 Wing end cover
20 Flap
20a First transition region
20b Second transition region
21 Main body
21a Shell
22 Stressed skin wing panel
22a First panel region (rigid)
22b Second panel region (flexible)
23 Retention- and actuation mechanism
23a Guide rail
23b Guide roller
23c Drive pinion
24 Recess
25 Rib
26 Lateral panel
27 Lateral panel
28 Coupling element
29 Reinforcement strip
30 Virtual rotary axis

The invention claimed is:

1. A lift-augmenting leading edge flap, for an aerodynamically effective wing with a defined wing profile, for a carrying wing of an aircraft, wherein the wing comprises a wing box which on a first side comprises a first skin and on a second, opposite, side comprises a second skin and on its end facing the flap comprises a wing end cover attached to the wing box such that the wing end cover guides the flap in a transition so as not to create any gaps between the flap and the wing end cover, the wing end cover at least in part follows on from the first skin in a wing profile shape, and wherein the flap comprises a substantially rigid main body which makes the transition from the first side to the second side of the wing, and a first transition region that faces the first side of the wing, and a second transition region that faces the second side of the wing, with said flap being adjustable, by a retention- and actuation mechanism that is coupled between the flap and the wing box, between a first, retracted, position in which said flap overlaps a larger part of the wing end cover, and a second, extended, position in which said flap overlaps a smaller part of the wing end cover, wherein the first transition region of the flap, which region faces the first side of the wing, is slidable, so as to rest in each position free of any gap, in relation to the first skin and/or in relation to the wing end cover that follows on from the first skin, wherein the flap is positionable between the first and the second position, by bending the flap in relation to the wing box and concurrent extension of the wing profile on a virtual rotary axis that is situated on the side opposite the first skin, outside the wing profile, wherein the second transition region of the flap, which region faces the second side of the wing, in each flap position is sealed off from the second skin so as to be free of any gap.

2. The lift-augmenting flap of claim 1, wherein the location of the virtual rotary axis, on which the flap is adjustable, is changeable along a defined curve, depending on the flap position.

3. The lift-augmenting flap of claim 2, wherein the retention- and actuation mechanism comprises guide rod linkages coupled between the wing box and the flap, with said retention- and actuation mechanism being drivable by an adjustment drive that acts on said guide rod linkages.

4. The lift-augmenting flap of claim 2, wherein the retention- and actuation mechanism comprises a guide rail that is coupled between the wing box and the flap and that essentially extends in wing depth direction, with said retention- and actuation mechanism being drivable by an adjustment drive that acts on the guide rail.

5. The lift-augmenting flap of claim 4, wherein the guide rail contained in the actuation mechanism is a toothed rack that can be driven by way of a driving pinion of the adjustment drive, which driving pinion engages said toothed rack.

6. The lift-augmenting flap of claim 4, wherein the guide rail is guided by guide rollers.

7. The lift-augmenting flap of claim 4, wherein the guide rail forms a circular arc that has the virtual rotary axis as its centre, and the wing end cover, which at least in part follows on from the first skin in a wing profile shape, is also circularly curved on the virtual rotary axis so that the first transition region of the flap is movable in the sense of a circular movement along the circularly curved wing end cover when the flap is adjusted.

8. The lift-augmenting flap of claim 7, wherein the retention- and actuation mechanism comprises several guide rails in the shape of circular arcs, which guide rails are arranged so as to be spaced apart in wingspan direction of the wing on the virtual rotary axis that contains the centre of their curvature.

9. The lift-augmenting flap of claim 8, wherein the guide rails in the shape of circular arcs, of which guide rails there are several and which guide rails are arranged so as to be spaced apart in wingspan direction of the wing, comprise an identical radius of curvature.

10. The lift-augmenting flap of claim 9, wherein the wing end cover which follows on from the first skin at least in part in wing profile shape has a radius of curvature that is constant in wingspan direction.

11. The lift-augmenting flap of claim 8, wherein each of the guide rails in the shape of circular arcs, of which guide rails there are several and which guide rails are arranged so as to be spaced apart in wingspan direction of the wing, comprises a different radius of curvature that becomes smaller in wingspan direction.

12. The lift-augmenting flap of claim 11, wherein the wing end cover which follows on from the first skin at least in part in wing profile shape has a radius of curvature that decreases in wingspan direction.

13. The lift-augmenting flap of claim 12, wherein the radii of curvature of the guide rails and of the wing end cover become smaller at the same ratio in wingspan direction.

14. The lift-augmenting flap of claim 11, wherein the main body of the flap tapers off in wingspan direction with the reduction of the radii of curvature of the guide rails or of the wing end cover.

15. The lift-augmenting flap of claim 1, wherein the virtual rotary axis on which the flap is adjustable is stationary for all flap positions.

16. The lift-augmenting flap of claim 1, wherein the second transition region of the flap, which transition region faces the second side of the wing, is formed on a stressed skin wing panel that follows on from the shell of the rigid main body of the flap and extends to the second skin of the wing, with the second transition region being provided for sliding in relation to the second skin so as to provide, in every flap position, a transition to said skin essentially without a gap.

17. The lift-augmenting flap of claim 16, wherein the region of the second skin, along which the second transition region of the flap is slidable in relation to the second skin when the flap is adjusted, extends essentially tangentially in relation to the virtual rotary axis.

18. The lift-augmenting flap of claim 16, wherein the second transition region is formed by a flexible region of the stressed skin wing panel that follows on from the rigid main body of the flap.

19. The lift-augmenting flap of claim 18, wherein the flexible region is provided at the end of the stressed skin wing panel that follows on from the rigid main body of the flap.

20. The lift-augmenting flap of claim 19, wherein the flexible region provided at the end of the stressed skin wing panel that follows on from the rigid main body of the flap is designed in the shape of a sealing lip that rests against the second skin.

21. The lift-augmenting flap of claim 18, wherein the stressed skin wing panel comprises a first, rigid, panel region that follows on from the rigid main body of the flap, and comprises a second, flexible, panel region which in turn follows on from said first panel region, and which forms the second transition region.

22. The lift-augmenting flap of claim 18, wherein the inside of the first, rigid, panel region comprises stiffening ribs that extend essentially in wing depth direction.

23. The lift-augmenting flap of claim 18, wherein the flexible region of the stressed skin wing panel that extends towards the second skin is produced from glass fibre reinforced plastic (GFRP).

24. The lift-augmenting flap of claim 16, wherein a recess or pocket is provided on the second skin so as to accommodate the stressed skin wing panel that extends towards the second skin, as a result of which recess or pocket an essentially smooth transition from the stressed skin wing panel of the flap to the second skin of the wing box is created at least in the retracted flap position.

25. The lift-augmenting flap of claim 24, wherein the recess has a depth that essentially corresponds to the thickness of the stressed skin wing panel that extends towards the second skin.

26. The lift-augmenting flap of claim 16, wherein the shell of the rigid main body of the flap or the rigid region of the stressed skin wing panel that extends towards the second skin is produced from carbon fibre reinforced plastic (CFRP).

27. The lift-augmenting flap of claim 1, wherein a locking device is provided on the wing box, by way of which locking device the stressed skin wing panel of the flap, which stressed skin wing panel extends towards the second skin, is lockable in relation to the wing box in the retracted flap position.

28. The lift-augmenting flap of claim 27, wherein the locking device is formed by cruise rollers.

29. The lift-augmenting flap of claim 1, wherein laterally on the flap a sealing device is provided which aerodynamically seals the flap off towards the outside.

30. The lift-augmenting flap of claim 29, wherein the sealing device comprises lateral panels that are slidable in relation to each other.

* * * * *